Aug. 7, 1951 A. C. SAMPIETRO 2,563,424
TORQUE-TRANSMITTING COUPLING
Filed Aug. 31, 1948 3 Sheets-Sheet 1
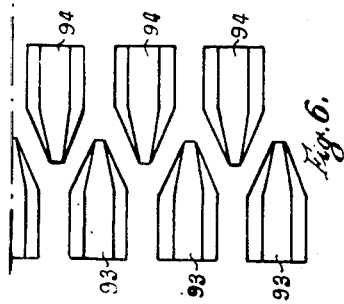
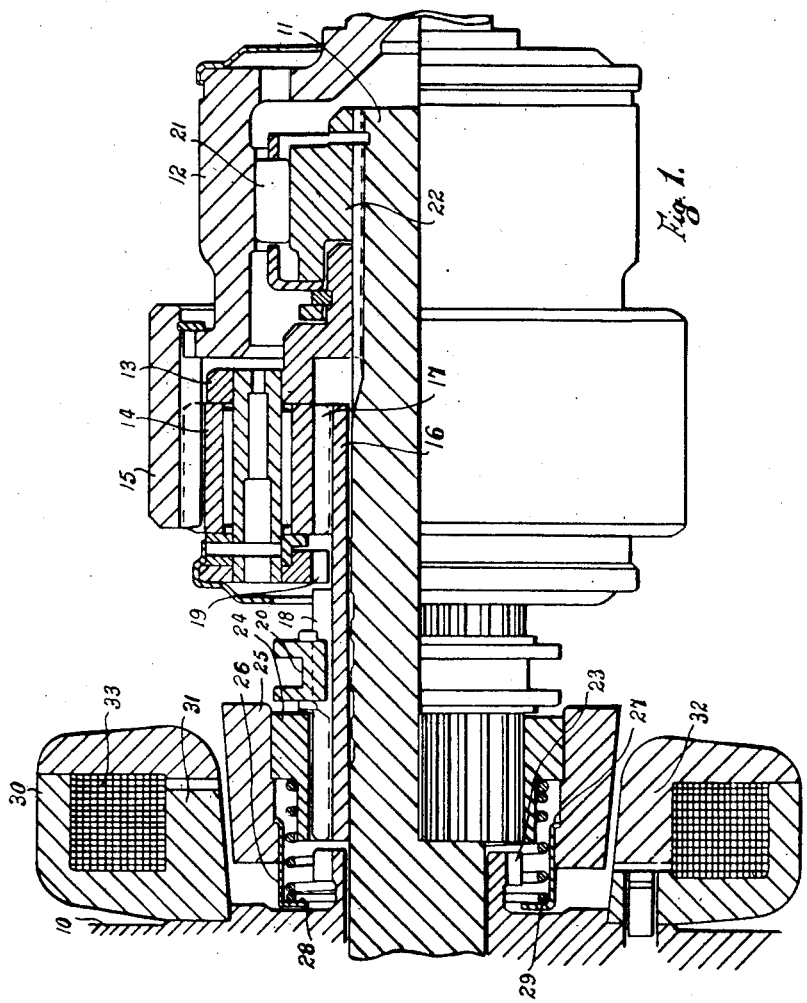
INVENTOR
ACHILLES CHARLES SAMPIETRO
by Richardson and David
ATTYs Aug. 7, 1951

A. C. SAMPIETRO 2,563,424

TORQUE-TRANSMITTING COUPLING

Filed Aug. 31, 1948

INVENTOR
ACHILLES CHARLES SAMPIETRO
By Richardson and David
ATTYS

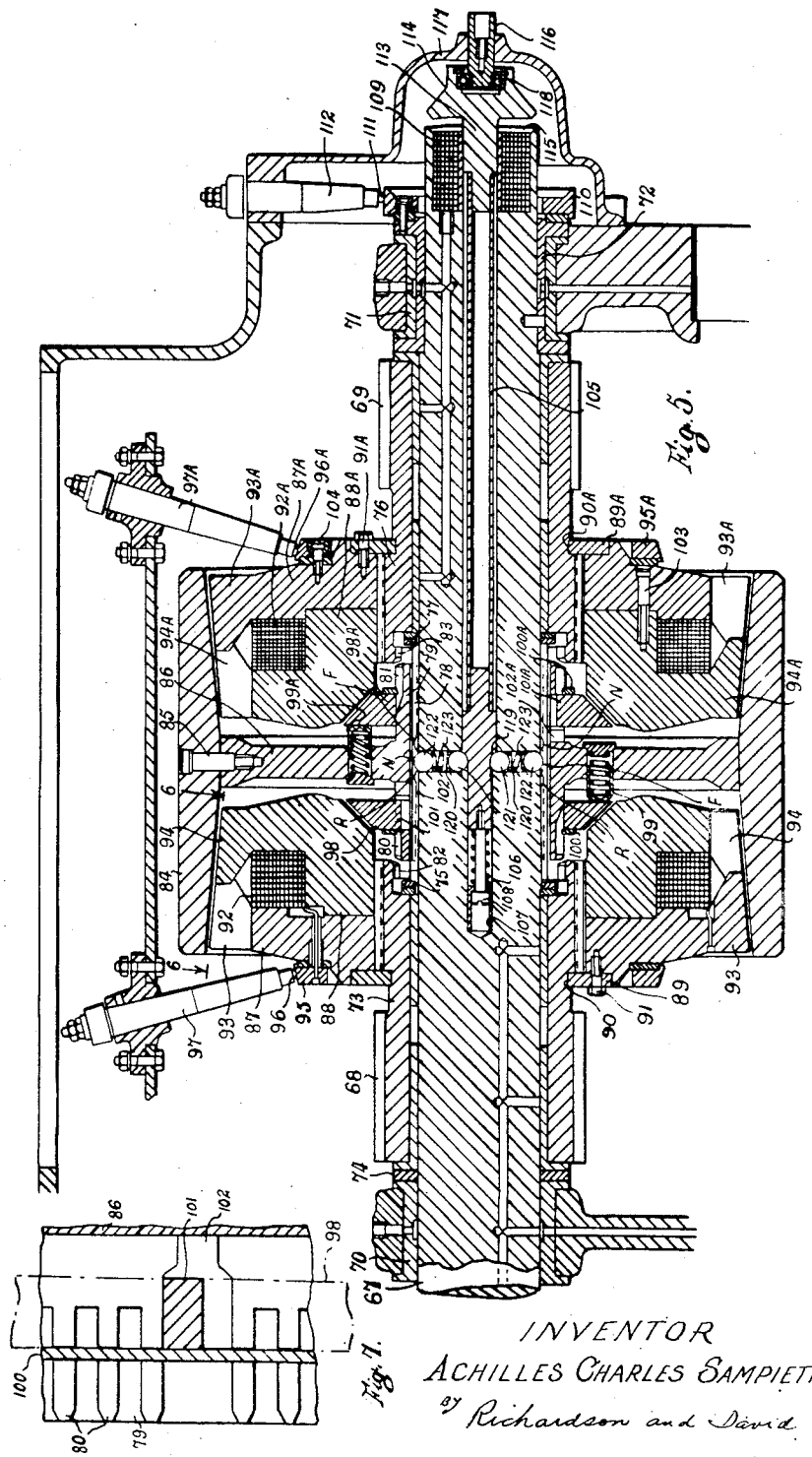

Patented Aug. 7, 1951

2,563,424

UNITED STATES PATENT OFFICE 2,563,424

TORQUE-TRANSMITTING COUPLING

Achilles Charles Sampietro, London, England, assignor of one-half to D. R. Robertson Limited, London, England Application August 31, 1948, Serial No. 47,097
In Great Britain September 5, 1947

10 Claims. (Cl. 172—284)

This invention relates to torque-transmitting couplings for conveying or preventing rotary motion. It is especially concerned with couplings of the kind (hereinafter termed a "baulked" coupling) in which the two co-operating elements of the coupling have to be at least approximately synchronised before the coupling is engaged. Such couplings are used, for example, in change-speed, reversing or selective gearing, either as clutches to couple together two rotatable elements or as stops to prevent the rotation of an element, such as the reaction member of a planetary gear train, which in some circumstances is required to be free to rotate. The invention is primarily concerned with jaw couplings, though it is also applicable to certain other kinds of couplings such for example as the wedging-roller cage-controlled type.

An object of this invention is to provide improved baulking means in such couplings, that is to say means which will prevent or render ineffective any attempt to engage them so long as they are not substantially synchronised.

Another object is to provide such baulking means which are also capable of developing an appreciable synchronising torque between the coupling elements.

Another object is to provide a control mechanism serving both as baulking and synchronising means and also as electrically operated shifting means.

Another object is to provide an electromagnetically actuated clutch in which the cooperating parts of its magnetic system are required to rotate, the clutch nevertheless dispensing with slip rings.

Three embodiments of the invention, all designed for use with direct current, will be described by way of example and with reference to the accompanying diagrammatic drawings, in which:

Fig. 1 is a part-sectional side elevation of a planetary two-speed gear embodying one form of the improved coupling engageable as a reaction stop for selecting the higher-speed ratio.

Fig. 5 is a sectional side elevation of a part of a reversing gear embodying two clutches according to the invention in a back-to-back arrangement.

Fig. 6 is a developed view of pole faces taken on the line 6—6 in Fig. 5.

Fig. 7 is a developed view of clutch and baulking teeth of one of the clutches of this reversing gear.

Figure 2:
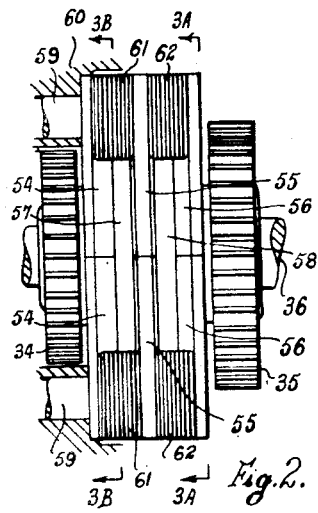
Fig. 2 is a side elevational of a part of the mechanism of a change-speed gear embodying two clutches according to the invention in a back-to-back arrangement.

In the embodiment of the invention shown in Fig. 1, a gear box 10 has an output shaft 11 adapted to be coupled to a driven member 12 by a 2-speed planetary overdrive gear. A planet-carrier 13 fast on the shaft 11 has pinions such as 14 meshing with an annulus gear 15 rigid with the driven member 12. A hollow shaft 16 slidable and rotatable on the shaft 11 is integral with a sun pinion 17 meshing with the planet pinions 14. Splines 18 on the shaft 16 can mesh with internal splines 19 on the front end of the planet-carrier 13 when the shaft 16 is slid to the rear through the agency of a striking ring 20. A free-wheel of the wedging-roller type includes rollers such as 21 co-operating with a surface in the driven member 12 and with a surface on a member 22 fast on the shaft 11.

The mechanism as so far described is of known kind. A direct drive from the shaft 11 to the member 12 is established by the free-wheel rollers 21, and this drive may be made bidirectional by causing the splines 18 and 19 to mesh together. In order to establish an overdrive ratio, the splines 18 and 19 are disengaged from each other by sliding the shaft 16 forwards and thereafter preventing this shaft from rotating.

The baulked jaw coupling provided, in accordance with this invention, for holding the shaft 16 stationary is arranged as follows. The external splines 18 on the shaft 16 match an externally splined ring 23 fast on the gear case 10. An internally splined sleeve 24 is permanently engaged with the shaft splines 18 and is slidable forwards into engagement with the splined ring 23 to hold the shaft 16 stationary. The armature is a ring 25 of magnetic material fixed on the sleeve 24. The outer surface of the armature 25 is frusto-conical and its smaller end is at the front. Its slant angle may be between 3° and 5° (6° and 10° included angle). The bore of the armature decreases in diameter towards the front end by two steps. The rearmost part of the bore is a force fit on a shallow thick radial flange at the rear end of the sleeve 24. The distance between the two steps slightly exceeds the distance through which the sleeve is shifted to engage the coupling. A tube 26 is a sliding fit in the front part of the bore of the armature and has at its rear end a shallow external flange 27 engaged behind the front step. An inturned flange 28 on the front end of the tube 26 abuts a wall of the gear case 10 in front of the splined ring 23 and acts as an abutment for the front end of a helical compression spring 29 the rear end of which abuts against the flange at the rear end of the splined sleeve 24. The tube 26 thus acts as a spring buffer projecting from the front of the assembly consisting of the armature and the splined sleeve and biasing the coupling to its disengaged condition.

The field member is a hollow ring 30, rather similar to the field member of small synchronous A. C. motors such as are commonly used in clocks, and containing a field winding 33. It is fixed to the wall of the gear case 10 in such a position that it surrounds the front part of the armature when the clutch is disengaged. The radially inner part of the field member is composed of pole-pieces in the form of two rings of interlaced prongs 31 and 32 and its bore is tapered to the same slope angle as the outer surface of the armature, from which it is spaced by a narrow air gap.

The change to the overdrive ratio is effected by disengaging the splines 18, 19 and thereafter energising the winding 33 by a predetermined direct current and retarding the shaft 11 while the driven member 12 continues to be rotated by the inertia of the load. So long as the hollow shaft 16 is rotating fast, the flux developed in the armature 25 by the field poles 31 and 32 induces eddy currents in the armature which have a demagnetising effect on the field. The field also urges the armature bodily forwards by a solenoid effect, but owing to the weakness of the field the magnetic attraction on the armature is insufficient to overcome the biasing spring 29. As the speed of the shaft 16 falls, the eddy currents become weaker and their demagnetising effect decreases until, when the shaft 16 has nearly come to rest under the action of the planetary gear, the magnetic attraction urging the armature forwards overcomes the biasing spring 29. The armature now begins to move forwards and in so doing reduces the reluctance of the air gap. The magnetic attraction therefore rapidly increases, and the sleeve 24 is shifted smartly forwards into mesh with the splined ring 23.

The coupling may be kept engaged either by maintaining the exciting current or by means of a mechanical striker (not shown) arranged to follow up the movement of the armature 25.

Figure 3:
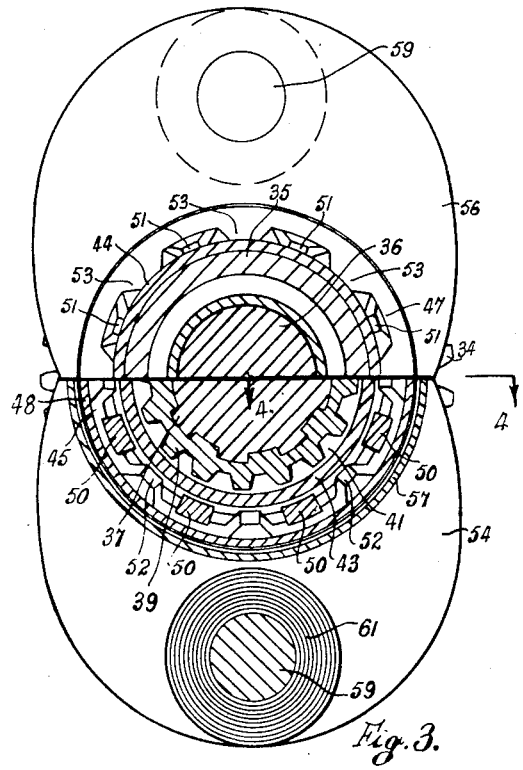
Fig. 3 is an end elevation, to a larger scale, of the same part, the upper half being sectioned on the line 3A—3A and the lower half on the line 3B—3B in Figs. 2 and 4.
Figure 4:
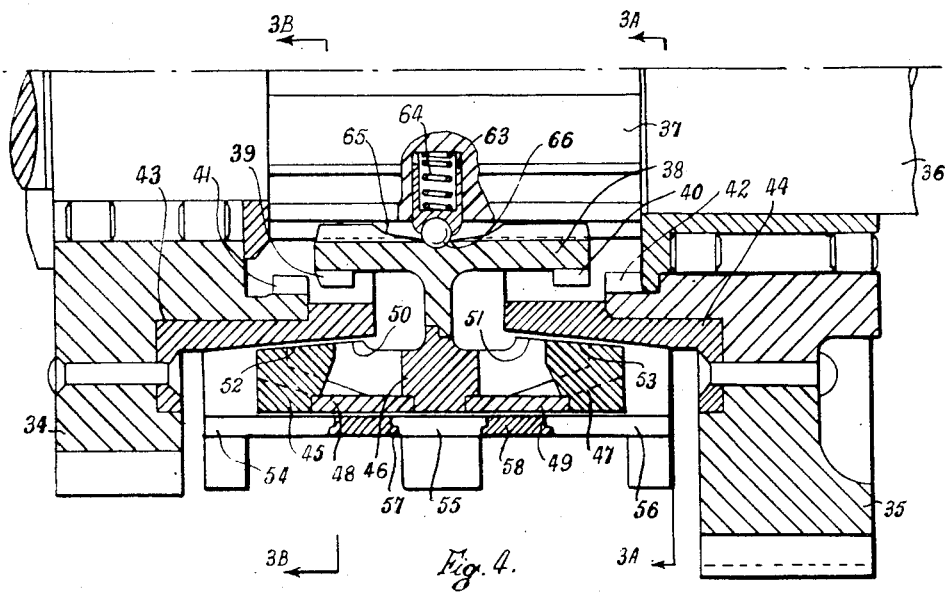
Fig. 4 is a section, to a still larger scale, on the line 4—4 in Fig. 3.

Figs. 2, 3 and 4 show a portion of a change-speed gear comprising two gear wheels 34 and 35 which are in constant mesh with gear wheels (not shown) on a driving shaft and which are alternatively engageable with an output shaft 36 by means equivalent to a conventional back-to-back pair of synchromesh clutches such as are used in automobile change-speed transmission gearing.

The output shaft 36 has a splined portion 37 on which is slidable an internally splined sleeve 38 having at its ends radial jaw-clutch teeth 39 and 40 adapted to be meshed, by sliding the sleeve 38 to one side and the other of the midposition in which it appears in Fig. 4, respectively with internal teeth 41 and 42 on the gear wheels 34 and 35. Two tubular armatures 43 and 44 are riveted to the gear wheels 34 and 35 respectively and project towards one another, their outer surfaces being frusto-conical.

The rotary part of the field structure consists of a polar inductor disposed outside the armatures and composed of three spaced rings 45, 46 and 47 of magnetic material and two tubular spacers 48 and 49 of non-magnetic material spigoted and brazed together. The jaw-clutch sleeve 38 has a central annular flange spigoted and brazed to the middle magnetic ring 46 which is provided with pole-pieces 50 and 51 extending respectively in an axial direction towards the ends of the inductor and having frusto-conical inner surfaces matching the surfaces of the armatures 43 and 44. The pole-pieces 50 and 51 are interlaced respectively with pole-pieces 52 and 53 extending from the end rings 45 and 47 towards the middle of the length of the inductor and also having frusto-conical inner surfaces matching the surfaces of the armatures 43 and 44.

The fixed part of the field structure includes a cylindrical housing consisting of three pairs of electro-magnetic pole-pieces 54—54, 55—55 and 56—56 and two tubular spacers 57 and 58 spigoted together. Each set of three pole-pieces 54, 55 and 56 is fixed on a magnetic core 59 and rigidly mounted in a gear case 60 so that the cylindrical housing is co-axial with the shaft 36 and surrounds the inductor 45—49 with a narrow air gap. The arrangement is such that, irrespective of the position of the clutch sleeve 38, the rings 45, 46 and 47 remain respectively within the pairs of pole-pieces 54—54, 55—55 and 56—56. Each magnet assembly is provided with two exciting windings 61 and 62 mounted on the core 59 and capable of being alternatively excited so as to produce like poles at the pole-pieces 54 and 56 and the opposite pole at the pole-piece 55.

The assembly, consisting of the clutch sleeve 38 and the inductor part 45—49 of the field structure which it carries, is biased towards the midposition in which it appears in Fig. 4 by two or more like ball-ended plungers, such as 63, uniformly distributed in the circumferential direction around the splined portion of the shaft 36. Each plunger 63 is slidable radially in a bore in the shaft and is urged outwards by a compression spring 64 into a shallow V notch 65 cut across an internal spline of the clutch sleeve 38. At the bottom of the notch is an arcuate depression 66 in which the head of the plunger can engage when the sleeve 38 is in the midposition, so that the axial force required to move the sleeve out of this position substantially exceeds the centring force that is exerted by the spring 64 when the sleeve 38 is out of the midposition.

The operation of each end half of this clutch is similar to that of the single clutch hereinbefore described with reference to Fig. 1.

Fig. 5 shows a part of a reversing gear, including selective clutch means adapted to couple a driving shaft 67 alternatively to a forward-drive pinion 68 and a reverse-drive pinion 69. The shaft 67 is rotatable in bearings 70 and 71, the latter being a locating bearing co-operating with a flanged sleeve 72 rigid with the shaft. The pinion 68 is integral with a hollow shaft 73 and is rotatable on the shaft 67, being located by thrust washers 74 and 75. The pinion 69 is likewise integral with a hollow shaft 76 and is rotatable on the shaft 67, being located axially by the sleeve 72 and thrust washers 77. The two sets of thrust washers 75 and 77 abut the ends of splines 78 on a part of the shaft 67. An internally-splined jaw-clutch sleeve 79 is slidable on the splines 78 and is provided at its ends with jaw-clutch teeth 80 and 81 adapted to engage respectively with teeth 82 and 83 on the shafts 73 and 76 when the sleeve 79 is moved to the left and to the right of the position in which it appears in Fig. 5.

A tubular armature 84, the bore of which diverges at a uniform taper from the middle towards each end, is fixed by screw dowels such as 85 to a flange 86 integral with the clutch sleeve 79. An electromagnet consisting of two annular parts 87 and 88 fixed together by screws (not shown) is splined to the hollow shaft 73 and locked axially thereon by means of a diametrically split ring 89 engaged in a groove 90 in the shaft 73 and fixed by screws such as 91 to the magnet part 87. The magnet parts together form a channel-section ring opening radially outwards and accommodating an exciting winding 92. The peripheral part of the magnet is formed by partly interlaced pole teeth 93 and 94 (Fig. 6) so arranged that each tooth is of opposite polarity to the teeth on each side of it. The pole faces of these teeth lie on a frusto-conical surface matching the bore of the armature 84. An insulated slip ring 95 mounted on the magnet part 87 by screws (not shown) is connected to one end of the winding 92, the other end of which is earthed. A brush 96 mounted in a fixed brush-holder 97 co-operates with the slip ring 95.

A baulking and synchronising ring 98 is slidable on the jaw-clutch sleeve 79 and has a frusto-conical face adapted to co-operate with a corresponding face on the magnet part 88. The baulking ring is urged, by three uniformly distributed spring-loaded plungers such as 99 projecting from the flange 86, towards a stop formed by a snap ring 100 engaged in notches in the teeth 80. The baulking ring 98 has three uniformly distributed teeth, such as 101, projecting radially inwards into shouldered slots 102 in the sleeve 79. Fig. 7 is a development of the end of the sleeve 79, sectioned at the level of the top of the teeth 80; from this figure it will be apparent that when torque is being transmitted between the sleeve 79 and the baulking ring 98 in either sense, the teeth 101 will lock against one or other of the shoulders of the notch 102 and so prevent the baulking ring from being moved to the right, but that, when the torque vanishes or decreases to a low value, the teeth 101 can ride along the sloping shoulders of the notch 102 and enter its narrow end under an axial force to the right applied to the baulking ring.

The right-hand half of the clutch has parts 87A to 102A, which are arranged as a mirror copy of the correspondingly numbered parts of the left-hand half of the clutch. In the right-hand half appear one of the screws, denoted by 103, holding together the magnet parts 87A and 88A, and one of the screws, denoted by 104, holding the slip ring 95A to the magnet part 87A.

A locking member 105 is slidable axially in a bore in the shaft 67 and urged to the right by a spring 106 compressed between the end of the member 105 and a cup 107 adapted to bear on the end of the bore. A screw 108 passing through a hole in the bottom of the cup and engaged in the end of the member 105 limits the expansion of the spring 106. A solenoid winding 109 which is fitted in a counterbore in the end of the shaft 67 has one end earthed and the other connected to an insulated slip ring 110 mounted on the sleeve 72 and co-operating with a brush 111 carried by a fixed holder 112. The outer end part of the locking member 105 is formed as a solenoid plunger 113 provided with a head 114 adapted to engage a seating 115 in the end of the shaft when the solenoid is operated. A push rod 116 slidable in a part 117 of a gear case co-operates through a thrust bearing 118 with the head 114 and provides control means alternative to the solenoid. The inner end part of the locking member is provided with a shoulder 119 co-operating with two compressible plungers slidable in opposed radial bores 120 in the shaft 67. Each of these plungers consists of two balls 121 and 122 separated by a helical compression spring 123. Each of the radially outer balls 122 co-operates with three notches F, N and R in the interior of the jaw-clutch sleeve 79.

The operation of the mechanism will be described on the assumption that it is used to connect an internal-combustion engine to a load, such as a marine propeller, imposing a torque which is now at low speeds. In order to engage the ahead drive from neutral, the coil 92 is energised while the engine is idling, and the flux developed in the armature 84 by the field poles 93 and 94 induces eddy currents in the armature which have the effect both of weakening the field and also of causing the system 84, 87, 88 to act as an eddy-current clutch and thereby set the ahead pinion 68 in rotation. The field also urges the armature to the left by a solenoid effect, but the field strength is insufficient to overcome the restraint imposed by the spring-loaded balls 122 engaged in the notches N. As the speeds of the shaft 67 and the pinion 68 approach synchronism, the eddy currents become weaker and their demagnetising effect decreases until finally the solenoid action overcomes the restraint imposed by the balls 122 and shifts the armature 84 and with it the jaw-clutch sleeve 79 to the left. The plungers 99 now urge the baulking ring 98 against the magnet part 88 and the frictional torque developed between these parts both assists the synchronising of the shaft 67 and the pinion 68 and also keeps the baulking teeth 101 engaged behind a shoulder of the notches 102. As soon as synchronism is substantially established, the solenoid action causes the baulking teeth to rise over the shoulders of the notches, so that the sleeve 79 can move farther to the left, engaging the jaw-clutch teeth 80 and 82 together. The balls 122 snap into the notches F and the locking member 105 may now be moved to the left so as to compress the springs 123 solid and thereby lock the jaw clutch in its engaged position so that the coil 92 can be de-energised. It will thus be apparent that the major part of the synchronising is done by the electromagnetic coupling, the mechanical baulking ring being required to effect only the final stage of synchronising, so that there is no risk of its becoming overheated. It can therefore be of small diameter and arranged to operate with a high specific loading.

When the locking member 105 is thereafter moved to the right, the springs 123 expand and the jaw-clutch sleeve 79 is thereby enabled to move to the neutral position under the influence of the spring-loaded plungers 99 as soon as the torque load on the system becomes low enough.

Engagement of the astern drive from neutral is carried out in a similar manner by excitation of the coil 92A.

For manoeuvring under conditions in which synchronism is not required to be established, the electromagnetic couplings can be engaged alternatively to act simply as eddy-current clutches.

For use where a supply of direct current is not conveniently provided, clutches according to this invention may be designed to employ low-frequency alternating current for energising the magnetic circuit. In such cases, owing to the difficulty of manufacturing a laminated field member of the intermeshing pole type, a homopolar type may be substituted provided the low torque capacity of this type at low slip rates can be compensated for by an increase in diameter.

I claim:

1. A baulked coupling including two relatively rotatable and cooperating mechanical clutching members, two co-axial elements operatively connected with said members and capable of being slid axially relatively to each other to engage the coupling, an armature mounted co-axially on one of said elements, a field member co-operating magnetically with said armature and mounted co-axially on the other of said elements, said armature and said field member being respectively in torque-transmitting connection with said clutching members through said elements, and said field member comprising circumferentially distributed poles so disposed in relation to said armature that lines of force crossing the air gaps between said poles and said armature will have a resultant lying in the axial direction such that said field member is capable of attracting said armature axially so as to cause engagement of the coupling, an exciting winding for the magnetic circuit comprising said field member and armature, and means biasing the clutching members towards their disengaged position, the force with which said biasing means oppose engagement of the coupling being such that, when said winding is energised by a current of predetermined value, so long as the relative speed of said field member and said armature exceeds a predetermined value, eddy currents, generated in said armature by said field member, develop a de-magnetising flux opposing the magnetising flux developed by the exciting winding and so reducing the excitation that the clutching members remain disengaged.

2. A baulked coupling including two relatively rotatable and cooperating mechanical clutching members, two co-axial elements operatively connected with said members and capable of being slid axially relatively to each other to engage the coupling, an armature mounted co-axially on one of said elements and having a frusto-conical surface, a field member mounted co-axially on the other of said elements and having circumferentially distributed poles the faces of which conform to a surface shaped correspondingly to and surrounding said frusto-conical surface, said armature and said field member being respectively in torque-transmitting connection with said clutching members through said elements, and said field member being capable of attracting said armature axially so as to cause engagement of the coupling, an exciting winding for the magnetic circuit comprising said field member and armature, and means biasing the clutching members towards their disengaged position, the force with which said biasing means oppose engagement of the coupling being such that, when said winding is energised by a current of predetermined value, so long as the relative speed of said field member and said armature exceeds a predetermined value, eddy currents, generated in said armature by said field member, develop a de-magnetising flux opposing the magnetising flux developed by the exciting winding and so reducing the excitation that the clutching members remain disengaged.

3. A coupling as claimed in claim 2, wherein the field member is in the form of a hollow ring of magnetic material containing the exciting winding, the radially inner part of this ring being composed of interlaced prongs projecting from the sides of the ring and forming pole-pieces, and the polarity of each pole-piece being opposite to that of the two immediately adjacent pole-pieces.

4. A baulked coupling including two relatively rotatable and cooperating mechanical clutching members, two co-axial elements operatively connected with said members and capable of being slid axially relatively to each other to engage the coupling, an armature mounted co-axially on one of said elements and having a frusto-conical surface, a field member mounted co-axially on the other of said elements and having circumferentially distributed poles the faces of which conform to a surface shaped correspondingly to and surrounded by the said frusto-conical surface, said armature and said field member being respectively in torque-transmitting connection with said clutching members through said elements, and said field member being capable of attracting said armature axially so as to cause engagement of the coupling, an exciting winding for the magnetic circuit comprising said field member and armature, and means biasing the clutching members towards their disengaged position, the force with which said biasing means oppose engagement of the coupling being such that, when said winding is energised by a current of predetermined value, so long as the relative speed of said field member and said armature exceeds a predetermined value, eddy currents, generated in said armature by said field member, develop a de-magnetising flux opposing the magnetising flux developed by the exciting winding and so reducing the excitation that the clutching members remain disengaged.

5. A coupling as claimed in claim 4, wherein the field member is in the form of a hollow ring of magnetic material containing the exciting winding, the radially outer part of this ring being composed of interlaced prongs projecting from the sides of the ring and forming pole-pieces, and the polarity of each pole-piece being opposite to that of the two immediately adjacent pole-pieces.

6. A baulked clutch including two rotatable and cooperating mechanical clutching members, two co-axial elements operatively connected with said members and capable of being slid axially relatively to each other to engage the clutch, an armature mounted co-axially on one of said elements, a polar inductor co-operating magnetically with said armature and mounted co-axially on the other of said elements, said armature and said inductor being respectively in driving connection with said clutching members through said elements, a stationary field member co-operating with said polar inductor and carrying an exciting winding, said polar inductor comprising circumferentially distributed poles and being capable of attracting said armature axially so as to cause engagement of the clutch, and means biasing the clutching members towards their disengaged position, the force with which said biasing means oppose engagement of the clutch being such that, when said winding is energised by a current of predetermined value, so long as the relative speed of said polar inductor and said armature exceeds a predetermined value, eddy currents, generated in said armature by said polar inductor, develop a de-magnetising flux opposing the magnetising flux developed by the exciting winding and so reducing the excitation that the clutching members remain disengaged.

7. A baulked clutch including two rotatable and cooperating mechanical clutching members, two co-axial elements operatively connected with said members and capable of being slid axially relatively to each other to engage the clutch, an armature having a frusto-conical surface and mounted co-axially on one of said elements, a polar inductor mounted co-axially on the other of said elements and having circumferentially distributed poles the faces of which conform to a surface shaped correspondingly to and surrounding the frusto-conical surface of the armature, said armature and said inductor being respectively in driving connection with said clutching members through said elements, said polar inductor also having cylindrical belts of magnetic material exposed at its radially outer surface, a stationary field member carrying an exciting winding and having pole faces lying on a cylindrical surface and surrounding respectively said belts, said polar inductor being capable of attracting said armature axially so as to cause engagement of the clutch, and means biasing the clutching members towards their disengaged position, the force with which said biasing means oppose engagement of the clutch being such that, when said winding is energised by a current of predetermined value, so long as the relative speed of said polar inductor and said armature exceeds a predetermined value, eddy currents, generated in said armature by said polar inductor, develop a de-magnetising flux opposing the magnetising flux developed by the exciting winding and so reducing the excitation that the clutching members remain disengaged.

8. A clutch as claimed in claim 7, wherein the radially inner part of said polar inductor is composed of interlaced prongs projecting from the said belts and forming pole-pieces, the polarity of each pole-piece being opposite to that of the two immediately adjacent pole-pieces.

9. A baulked coupling including two relatively rotatable and cooperating mechanical clutching members, two co-axial elements operatively connected with said members and capable of being slid axially relatively to each other to engage the coupling, an armature mounted co-axially on one of said elements, a field member co-operating magnetically with said armature and mounted co-axially on the other of said elements, said armature and said field member being respectively in torque-transmitting connection with said clutching members through said elements, and said field member comprising circumferentially distributed poles and being capable of attracting said armature axially so as to cause engagement of the coupling, an exciting winding for the magnetic circuit comprising said field member and armature, means biasing the clutching members towards their disengaged position, and a control member operable for locking the coupling in its engaged condition, the force with which said biasing means oppose engagement of the coupling being such that, when said winding is energised by a direct current of predetermined value, so long as the relative speed of said field member and said armature exceeds a predetermined value, eddy currents, generated in said armature by said field member, develop a de-magnetising flux opposing the magnetising flux developed by the exciting winding and so reducing the excitation that the clutching members remain disengaged.

10. A baulked coupling including two relatively rotatable and cooperating mechanical clutching members, two co-axial elements operatively connected with said members and capable of being slid axially relatively to each other to engage the coupling, an armature mounted co-axially on one of said elements, a field member co-operating magnetically with said armature and mounted co-axially on the other of said elements, said armature and said field member being respectively in torque-transmitting connection with said clutching members through said elements, and said field member comprising circumferentially distributed poles and being capable of attracting said armature axially so as to cause engagement of the coupling, an exciting winding for the magnetic circuit comprising said field member and armature, means biasing the clutching members towards their disengaged position and a baulking member mounted on one of said elements for frictional engagement with the other of said elements in consequence of initial relative sliding movement of said elements in the engaging direction, said baulking member having an inertia locking engagement with the element on which it is mounted so that on reversal of the torque transmitted by such frictional engagement said baulking member will shift axially relatively to the last-mentioned element and permit engagement of the coupling, the force with which said biasing means opposes engagement of the coupling being such that, when said winding is energised by a current of predetermined value, so long as the relative speed of said field member and said armature exceeds a predetermined value, eddy currents, generated in said armature by said field member, develop a de-magnetising flux opposing the magnetising flux developed by the exciting winding and so reducing the excitation that the clutching members remain disengaged, said baulking member thus becoming operative only after said magnetising flux has become large enough to overcome said biasing means.

ACHILLES CHARLES SAMPIETRO.

REFERENCES CITED

The following references are of record in the file of this patent:

UNITED STATES PATENTS

| Number | Name | Date |
| --- | --- | --- |
| 875,757 | Watson | Jan. 7, 1908 |
| 1,136,279 | Severy | Apr. 20, 1915 |
| 1,825,934 | Bing | Oct. 6, 1931 |
| 2,180,412 | Hart | Nov. 21, 1939 |
| 2,193,214 | Winther | Mar. 12, 1940 |
| 2,401,187 | Prince | May 28, 1946 |
| 2,453,957 | Allen | Nov. 16, 1948 |